Oct. 31, 1933.  F. B. BELL  1,933,361
LANDING GEAR FOR AIRPLANES
Filed May 22, 1929  2 Sheets-Sheet 1
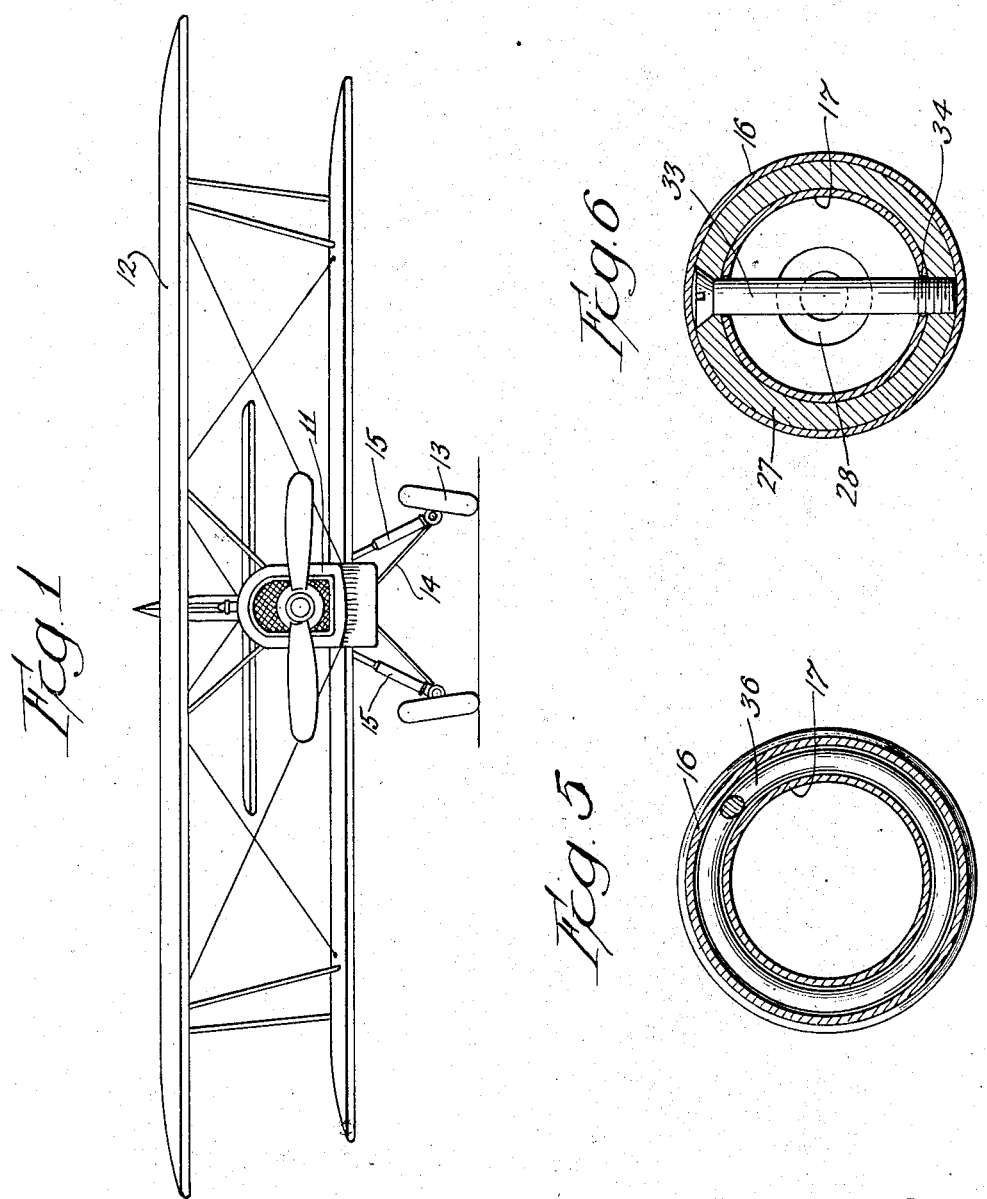
Inventor:
Frank B. Bell
John C. Carpenter
Atty:-

Oct. 31, 1933.    F. B. BELL    1,933,361
LANDING GEAR FOR AIRPLANES
Filed May 22, 1929    2 Sheets-Sheet 2
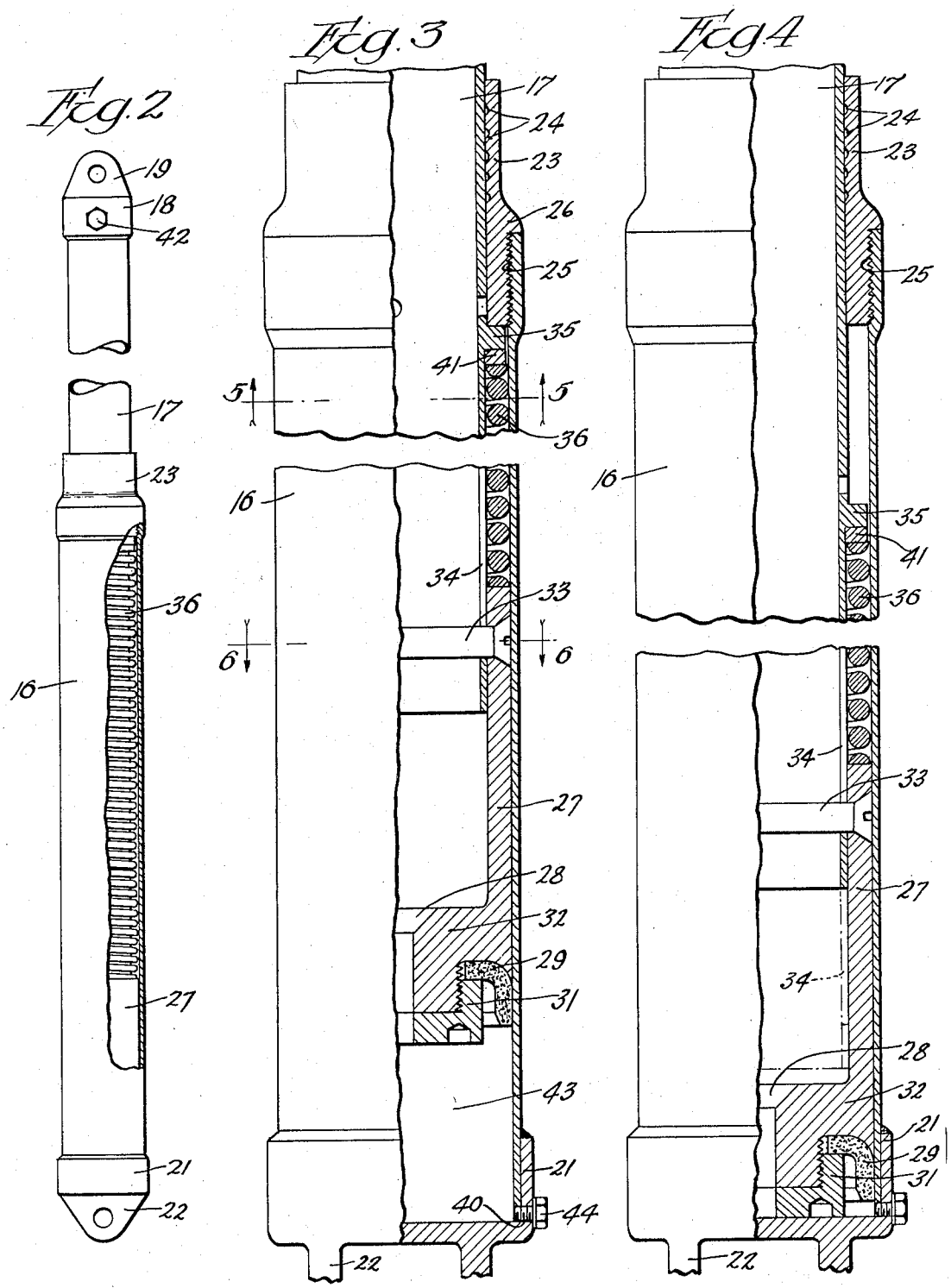

Patented Oct. 31, 1933

1,933,361

UNITED STATES PATENT OFFICE 1,933,361

LANDING GEAR FOR AIRPLANES

Frank B. Bell, Pittsburgh, Pa., assignor to Edgewater Steel Company, Pittsburgh, Pa., a corporation of Pennsylvania Application May 22, 1929. Serial No. 365,045

5 Claims. (Cl. 267—34)

This invention relates in general to airplane landing gears, and has more particular reference to airplane landing gears wherein the cushioning of impact and travel over the ground in taxiing is absorbed and cushioned by elastic and shock absorbing struts arranged between the wheels and the airplane body.

A principal object of the present invention is the provision of an airplane landing gear having shock absorbing or elastic struts of novel and improved construction and adapted to effectively absorb and cushion the shock of impact upon landing, and to absorb and cushion also the shocks and jars of taxiing over rough ground after landing and as an incident to taking off in flying.

Another important object of the invention is the provision of an airplane landing gear having elastic or shock absorbing struts constructed and arranged to minimize or eliminate bouncing of the airplane in taking off and landing, and constructed and arranged also to minimize tendency of the airplane body to swerve or rock in turning sharply in taxiing.

Another important object of the invention is the provision of an improved shock absorbing strut for an airplane landing gear which, while effectively cushioning the airplane in landing and also in taxiing over rough ground, will consist of a minimum number of sturdy parts of simple construction and unlikely to require frequent repair, replacement or attention in service.

Numerous other objects and advantages of the invention will be apparent as it is better understood from the following description which, when taken in connection with the accompanying drawings, discloses a preferred embodiment thereof.

Referring to the drawings:

Figure 1 is a front elevation of an airplane provided with landing gear struts embodying my present invention.

Fig. 2 is an enlarged side elevation of one of the landing gear struts shown in Fig. 1, parts being shown in section;

Figs. 3 and 4 are fragmentary views further enlarged and broken away, showing features of internal construction;

Fig. 5 is a section taken substantially on the line 5—5 of Fig. 3; and

Fig. 6 is a section taken substantially on the line 6—6 of Fig. 3.

Referring first more particularly to Fig. 1; reference character 11 indicates generally the airplane body. This body has wings 12, and is mounted upon a landing gear consisting principally of wheels 13, rigid connecting struts 14, and elastic or shock absorbing struts 15. The showing in Fig. 1 is schematic, and this figure is provided chiefly to show generally the location of the elastic or shock absorbing struts 15 with respect to other associated parts. The struts 15 are, of course, pivoted both to the wheel axle and to the airplane body, and the struts 14 to the airplane body.

The struts 15 are alike in construction and a description of one will satisfy. Each strut 15 comprises extensible or telescoping members, each of which is or may be made up of a number of parts. Reference character 16 indicates an outer tube, and reference character 17 an inner tube, these tubes being arranged in telescoping relation. The tube 17 is provided with a cap or closure 18 having a perforated web or extension 19 adapted for pivotal connection to the airplane body. The outer telescoping member or tube 16 is provided with a like cap or head 21 having a perforated web or extension 22 for similar connection to the running gear or wheel axle of the airplane. The outer member or tube 16 is of diameter substantially larger than the diameter of the inner tube or member 17 and is provided with a reducing collar or sleeve 23 slidably engaging the outer surface of the inner tube or member 17, packing 24 being provided if desired to make a liquid-tight fit between the telescoping members or tubes.

The collar or sleeve 23 is preferably provided with external threads 25 arranged below an outwardly extending shoulder 26. The tube 16 has companion threads at its upper open end engaging the threads 25 and permitting its secure connection to the sleeve when the end of the tube 16 is screwed against the shoulder 26 as may be observed in Figs. 3 and 4.

A plunger 27 is arranged within the tube 16 and is provided with a central restricted opening or orifice 28. The plunger is preferably provided with a cup washer 29, which is held in place by a plunger cap 31 screwed on the end of the plunger and confining the inner end of the cup washer against the plunger head 32.

The inner tube 17 extends well down within the tube 16 and well into the plunger 27. A cross bolt 33 is arranged through the plunger and through slots 34 provided at diametrically opposite walls of the tube 17.

A spring 36 is interposed between the plunger and a shoulder 35 provided on the inner tube or member 17 and extending outwardly into closely adjacent relation with the inner surface of the outer tube or member 16. The spring 36 is or may be of any usual or preferred form, one of coil type being shown on the drawings.

A bearing collar 41 is or may be provided between the shoulder 35 and the upper end of the spring. When the parts are assembled, compression may, if desired, be given the spring 36, this compression being maintained by the bolt 33 and the engagement of it with the lower ends of the slots 34. A quantity of oil or other liquid is provided within the telescoping tube members 16 and 17 and through an opening in the cap 18 and tube 17, which opening is shown on the drawings as closed by a set screw or a plug 42. Reference character 40 indicates an oil drain opening at the bottom of the cap 21, a plug 44 being provided to close this drain.

Referring to Fig. 3, the arrangement of the parts of the shock absorbing struts in fully extended relation may be observed. This is their arrangement when the airplane is flying and the landing gear is suspended from the airplane body. At this time, the oil or liquid has flowed downwardly through the orifice 28 to fill the chamber 43 therebelow. Upon landing, the initial impact or shock is transmitted through the spring 36 to the plunger, and the oil or liquid is forced rapidly through the opening or orifice 28, the spring 36 cushioning the jar of impact and cushioning also the transmission of force to the plunger and liquid.

Fig. 4 illustrates the relative positions of the parts when the airplane is resting upon the ground and when it is taxiing over the ground after the oil or liquid has flowed through the orifice 28 as a result of the landing. In taxiing, the shocks resulting from running across uneven ground is felt by and absorbed in the spring 36, as will be readily understood. It will be manifest that the resistance to shock is much greater upon the landing of the airplane, since at that time both the liquid orifice cushioning and the spring 36 are acting together.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an airplane landing gear, a shock absorbing strut comprising members relatively arranged to be held in extended relation and to contain a quantity of liquid, a said member having an orifice through which said liquid must move upon compression of the strut, and a spring transferring the compressive force to said liquid to force said liquid through said orifice upon compression of said strut.

2. In an airplane landing gear, a shock absorbing strut comprising telescoping members, a plunger arranged within a said member and adapted to bear upon and permit passage of liquid contained in a said member, and a spring interposed between a said member and said plunger for transferring pressure of compression to said liquid, said spring being adapted to sustain the load of the airplane and cushion its movement in taxiing.

3. In an airplane landing gear, a shock absorbing strut comprising members arrangeable in extended relation when the airplane is in the air, said members providing a chamber to contain a body of liquid between them when in extended relation and having an orifice through which said liquid must pass upon compression, and means for cushioning impact compressing said strut and cushioning also the compression of the liquid before passage through said orifice.

4. In an airplane landing gear, a shock absorbing strut, comprising telescoping members arrangeable in extended relation when the airplane is in the air, a liquid carried in said members, a plunger having an orifice and presenting a full lower face except for the orifice to said liquid, and a spring transmitting the shocks of landing to said liquid through said plunger.

5. In an airplane landing gear, a shock absorbing strut, comprising a pair of telescoping sleeves having body portions spaced apart, a plunger movable between said body portions and having an orifice for the transmission of liquid, and a spring arranged between said body portions and bearing upon said plunger to transmit shock of landing through said plunger to said liquid.

FRANK B. BELL.